United States Patent
Dittmar et al.

(10) Patent No.: US 8,572,996 B2
(45) Date of Patent: Nov. 5, 2013

(54) AIR CONDITIONING SYSTEM WITH HYBRID MODE BLEED AIR OPERATION

(75) Inventors: Jan Dittmar, Buxtehude (DE); Nicolas Antoine, Toulouse (FR); Uwe Buchholz, Bliedersdorf (DE)

(73) Assignees: Airbus Operations GmbH, Hamburg (DE); Airbus S.A.S., Blagnac Cedex (FR)

( * ) Notice: Subject to any disclaimer, the term of this patent is extended or adjusted under 35 U.S.C. 154(b) by 320 days.

(21) Appl. No.: 12/744,165

(22) PCT Filed: Nov. 26, 2008

(86) PCT No.: PCT/EP2008/010030
§ 371 (c)(1),
(2), (4) Date: Mar. 1, 2011

(87) PCT Pub. No.: WO2009/068265
PCT Pub. Date: Jun. 4, 2009

(65) Prior Publication Data
US 2011/0138822 A1    Jun. 16, 2011

(30) Foreign Application Priority Data
Nov. 29, 2007    (DE) .......................... 10 2007 057 536

(51) Int. Cl.
*F25B 27/00*    (2006.01)

(52) U.S. Cl.
USPC .......................................................... 62/236

(58) Field of Classification Search
USPC ...................................... 62/87, 236, 275, 402
See application file for complete search history.

(56) References Cited

U.S. PATENT DOCUMENTS 4,262,495 A *   4/1981   Gupta et al. .................... 62/402
4,263,786 A     4/1981   Eng
(Continued)

FOREIGN PATENT DOCUMENTS

CN      1705585 A     12/2005
RU      2271314 C9    4/2005
(Continued)

OTHER PUBLICATIONS

H. Knigge et al., "Dynamic System Simulation of an Aircraft Cabin Climate for Comfort-Improved Climate Control," Institute for Thermo-Fluid Dynamics, Hamburg University of Technology , Applied Thermodynamics, HVAC; AST 2007, Mar. 29-30, Hamburg, Germany.

(Continued)

*Primary Examiner* — Melvin Jones
(74) *Attorney, Agent, or Firm* — Thedford I. Hitaffer; Hitaffer & Hitaffer, PLLC

(57) ABSTRACT

An energy supply system for operating at least one air conditioning system of an aircraft, comprises at least one air line network and at least one electric line network. The air line network is connected to the air conditioning system and at least one bleed air connection for routing bleed air to the air conditioning system. The electric line network is connected to the air conditioning system and at least one electrical energy source for routing electrical energy to the air conditioning system. The air conditioning system has an electrically operable cooling device. By means of the energy supply system according to the invention the energy withdrawn from the power units is better adapted to the energy necessary for operating the air conditioning system and other systems—such as, for example, wing de-icing—and therefore reduces the excess fuel consumption of the aircraft.

23 Claims, 5 Drawing Sheets

(56) References Cited

Figure 1:
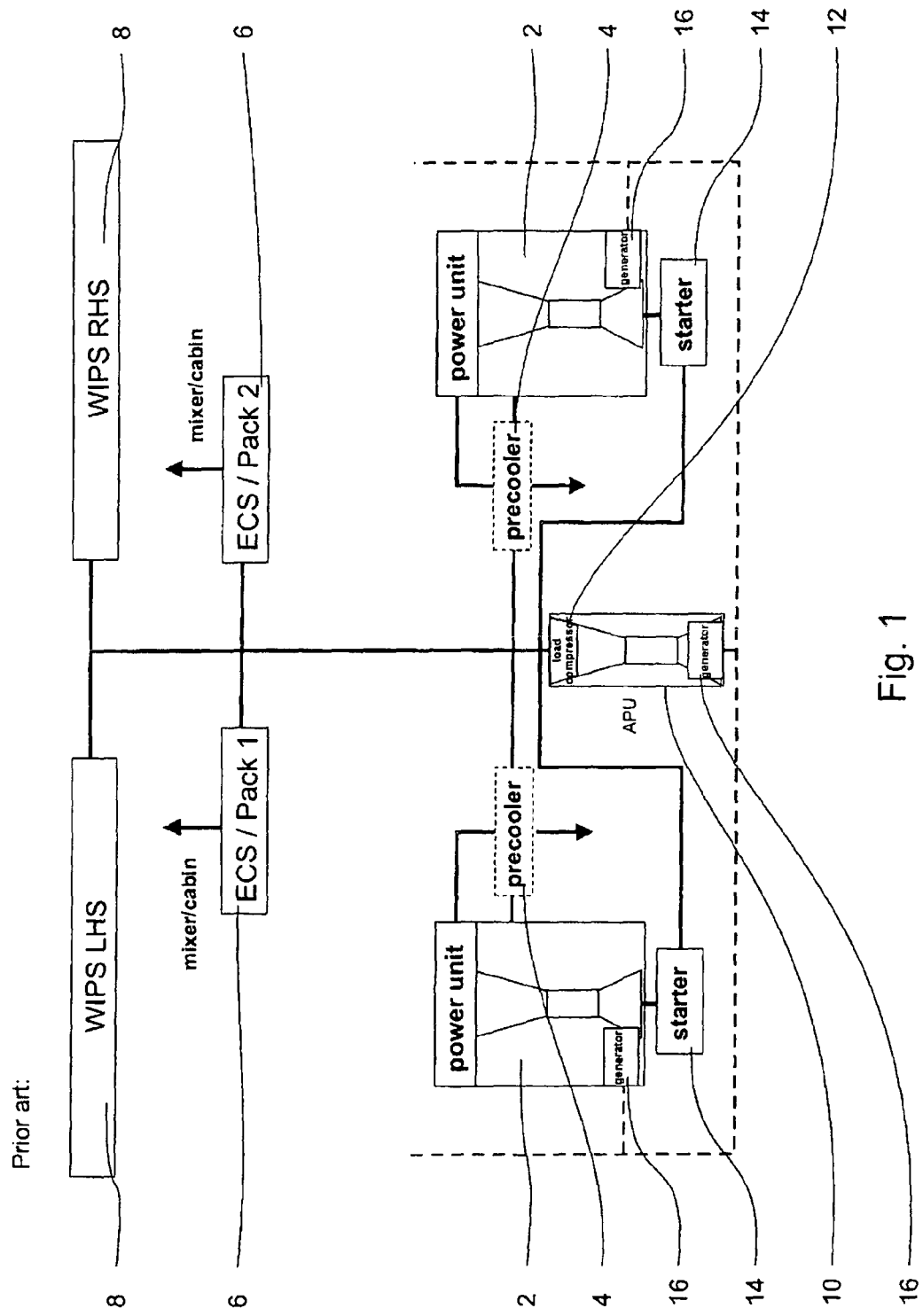

U.S. PATENT DOCUMENTS 6,427,471 B1 8/2002 Ando
2002/0113167 A1 8/2002 Albero
2004/0129835 A1 7/2004 Atkey

FOREIGN PATENT DOCUMENTS

WO 2002066324 A2 8/2002
WO 2004037641 A2 5/2004

OTHER PUBLICATIONS

CN 100083, First Office Action, dated Jul. 4, 2012.
DeQi's English Summary of the First Office Action Text.
WO 2009/068265 A1, International Search Report.
WO 2009/068265 A1, Transmittal of International Search Report, Written Opinion of International Searching Authority, International Search Report, Written Opinion of International Searching Authority (PCT Rule 43bis. 1).
AP, ARS-Patent, Intellectual Property Law Firm, Saint Petersburg, Russia, Letter from Russian Association summarizing First Russian Office Action dated Oct. 23, 2012.
First Russian Office Action, dated Oct. 23, 2012.

\* cited by examiner

AIR CONDITIONING SYSTEM WITH HYBRID MODE BLEED AIR OPERATION

CROSS REFERENCE TO RELATED APPLICATIONS

This application is the National Phase of International Application PCT/EP2008/010030, filed Nov. 26, 2008, which designated the U.S. and that International Application was published in English under PCT Article 21(2) on Jun. 4, 2009 as International Publication Number WO/2009/068265 A1, the disclosure of which is incorporated herein by reference. PCT/EP2008/010030 claims priority to German Patent Document No. 10 2007 057 536.1.

The invention relates to an energy supply system for operating at least one air conditioning system of an aircraft, an air conditioning system for an aircraft and a method for air-conditioning an aircraft.

In order to supply aircraft air conditioning systems and other systems such as, for example, de-icing systems with energy and fresh air, air is usually withdrawn from a compressor stage of a power unit or of a compressor driven by an APU and routed to air conditioning system units ("packs") as well as wing anti-icing systems. During flight this heated and pressurised air, which is also called "bleed air", represents the sole energy source for the air conditioning system units, the energy of which must be sufficient both to pressurise the aircraft cabin and to operate the corresponding refrigeration process. The pressure requirement of the various systems to be supplied with bleed air determines the necessary pressure at the bleed air connection of the compressor stage of the power unit or of the compressor driven by the APU. The decisive factor here is in particular the requirement of the packs, which need a relatively high air pressure for operating the thermodynamic cycle and for feeding cold or fresh air into the cabin.

However a higher necessary bleed air pressure also results in a higher bleed air temperature on account of the more intense compression in the power unit. In order to prevent damage in components receiving bleed air, the bleed air must be limited to a predetermined maximum temperature and consequently also cooled by a precooler dependent upon its temperature. The operation of a precooler which is designed as a heat exchanger necessitates an additional medium which absorbs heat and is usually in the form of bleed air of a low pressure level from a fan stage of a main power unit of the aircraft. This cooling air leaves the precooler in the outward direction into the environment of the aircraft with an additional heat input from the bleed air which is to be cooled and is no longer available as an energy carrier for further use in the aircraft.

In addition to the energy supply of the actual aircraft air conditioning system, bleed air is also routed into a line network inside the wing leading edge flaps ("slats") in order to heat the inside of the slats here, so that the formation of an ice layer on the outside of the slats is prevented.

In the case of a conventional pneumatic and bleed air-based air conditioning and energy supply system, bleed air from a compressor which is driven by the APU is also used to start one or a plurality of the main power units of the aircraft by means of a pneumatic power unit starter unit. This pneumatic-based energy architecture is a sturdy and proven system which is used in many aircraft throughout the world. However this method of bleed air-based extraction of energy from power units represents a distinct disadvantage of the gas turbine process taking place here. Since, moreover, the bleed air connections are disposed in a mechanically fixed manner inside the power units, the bleed air pressure at the bleed air connections varies with different power unit states. This makes it more difficult to bring the quantity of pneumatic energy which is withdrawn into line with the energy necessary for operating the systems. The positions of the bleed air connections are generally designed so that the bleed air pressure available here is always sufficient in all design situations to correctly operate the aircraft air conditioning system (for example in the case of a hot environment or various fault situations). This means that the bleed air pressure applied to the bleed air connections distinctly exceeds the required bleed air pressure under normal conditions. This discrepancy requires the use of pressure and volumetric flow rate regulating valves, whereby some of the energy withdrawn from the power units is negated or remains unused. This results, at most operating points, in an excess withdrawal of bleed air power from the power unit and thereby a distinct excess fuel consumption overall.

A further disadvantage of a conventional air conditioning system based entirely on bleed air lies in the accelerated material fatigue, caused by the high bleed air temperature, of the throttle and withdrawal valves at the bleed air connections, which reduces their service life accordingly.

The object of the invention is to reduce or eliminate the above-mentioned disadvantages. The object of the invention is in particular to propose an energy supply system of the type initially mentioned with which the withdrawal of bleed air from the power units of the aircraft is optimised such that the power which is withdrawn from the power units corresponds substantially to the power which is necessary for the air conditioning system. The object of the invention is also to minimise excess fuel consumption, which would result from throttle and heat losses of power unit power withdrawn in excess.

The object is achieved by an energy supply system for supplying at least one air conditioning system of an aircraft, with at least one air line network and at least one electric line network, wherein the air line network is connected to the air conditioning system and at least one bleed air connection for routing bleed air to the air conditioning system, the electric line network is connected to the air conditioning system and at least one electrical energy source for routing electrical energy to the air conditioning system, and the air conditioning system has an electrically operable cooling device.

An energy supply system of this kind enables bleed air to be withdrawn from power units at a relatively low pressure level. In this respect the withdrawn bleed air does not serve to completely operate an air conditioning process which includes pressurisation of the cabin and cooling. The energy supply system according to the invention rather provides bleed air which at least guarantees pressurisation of the cabin in all operating states. The energy necessary in addition for cooling the fresh air routed to the cabin is provided by an electrical cooling system. This hybrid pneumatic and electrical supply of the air conditioning system is an advantageous possibility of adapting the energy withdrawn from the power units to the necessary energy as accurately and with as little losses as possible. The deviations in the ambient temperature which are to be expected during usual aircraft uses do not have to be taken into account when planning the bleed air withdrawal, but can instead easily be compensated by the electrical cooling.

In one advantageous development bleed air is withdrawn from two bleed air connections in each case at the power units, the respective bleed air connections of a power unit being at different pressures. This results in further optimisation of the withdrawal of the bleed air and a reduction of the throttle losses which would occur upon reducing the pressure and the volumetric flow rate when using a single bleed air connection.

By withdrawing bleed air at a relatively low pressure level, the temperature of the bleed air is lower than in the case of conventional systems. As a result, no conventional bleed air-operated precooler is necessary in the system according to the invention. The use of a precooling system consisting of a ram air channel and a heat exchanger disposed therein requires no further energy supply and therefore represents a distinct saving in terms of excess fuel consumption. In addition to this, no bleed air leakage detection device is necessary in the ideal case. This is due to the fact that, given a configuration which is optimised in terms of pressure losses, the bleed air can be tapped at a pressure level at which the associated bleed air temperature is so low that no safety-critical surface temperatures arise in the event of a leakage in the bleed air system. It is therefore no longer necessary to detect the leakage for safety reasons. It is thus possible to dispense with the complex installation of a detection system, resulting in a reduction in weight, costs and manufacturing times when assembling the aircraft.

The lowering of the bleed air temperature also leads to a longer service life and longer intervals between maintenance of the bleed air valves, as the thermal load thereof lies at a level which is tolerable when compared with the prior art.

The replacement of conventional pneumatic power unit starter units by generator/starter units which are integrated into the power units simplifies the air line network in the aircraft which routes bleed air. The simplification of the air line network is increased by replacing a pneumatic de-icing or wing anti-icing system by electrical systems. Consequently no further withdrawal of bleed air is necessary during flight in icing-up conditions, so that the bleed air connections can be designed for a lower volumetric flow rate and pressure, and the withdrawal of energy from the power units is thereby additionally optimised.

If a fully electric APU—for example in the form of a fuel cell or similar—is used in the aircraft in question, the air supply when on the ground can be provided either by an electrically driven fan and/or an external air inlet. The maintenance costs and the construction space of the APU are at the same time reduced.

The object is also achieved by an air conditioning system and a method for air-conditioning an aircraft having the features of the co-ordinated claims.

Figure 2:
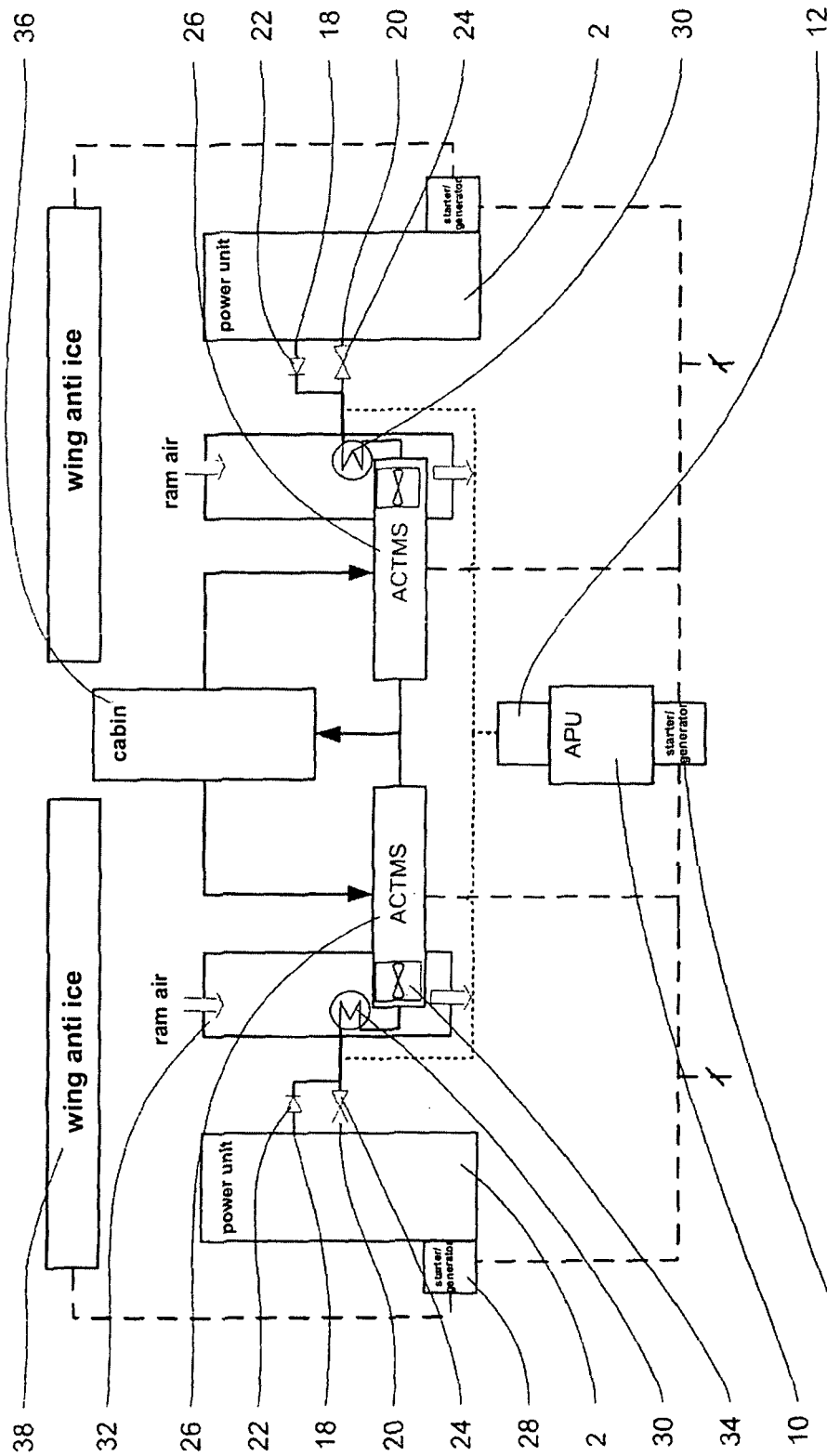
Figure 3:
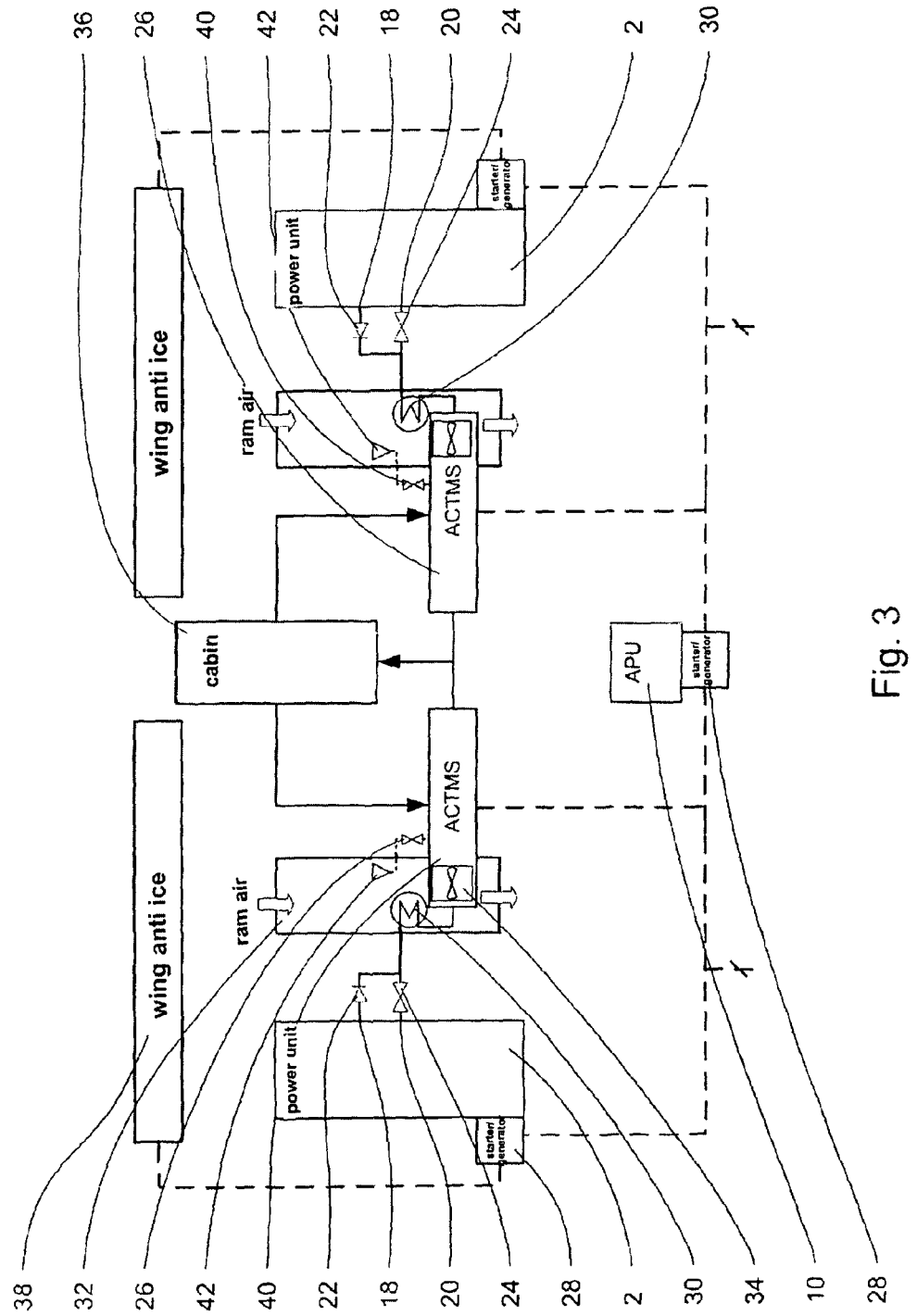
Figure 4:
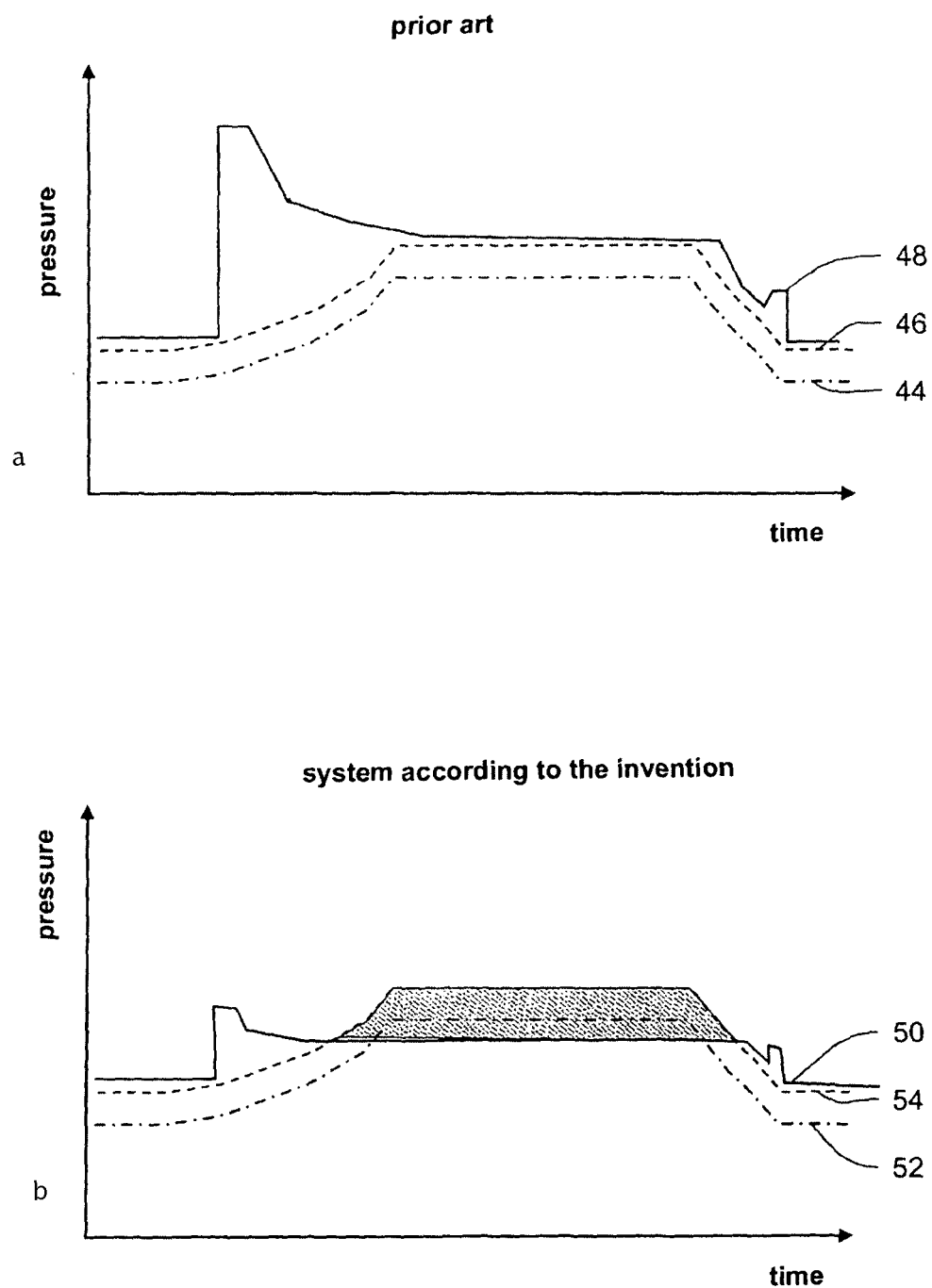
Figure 5:
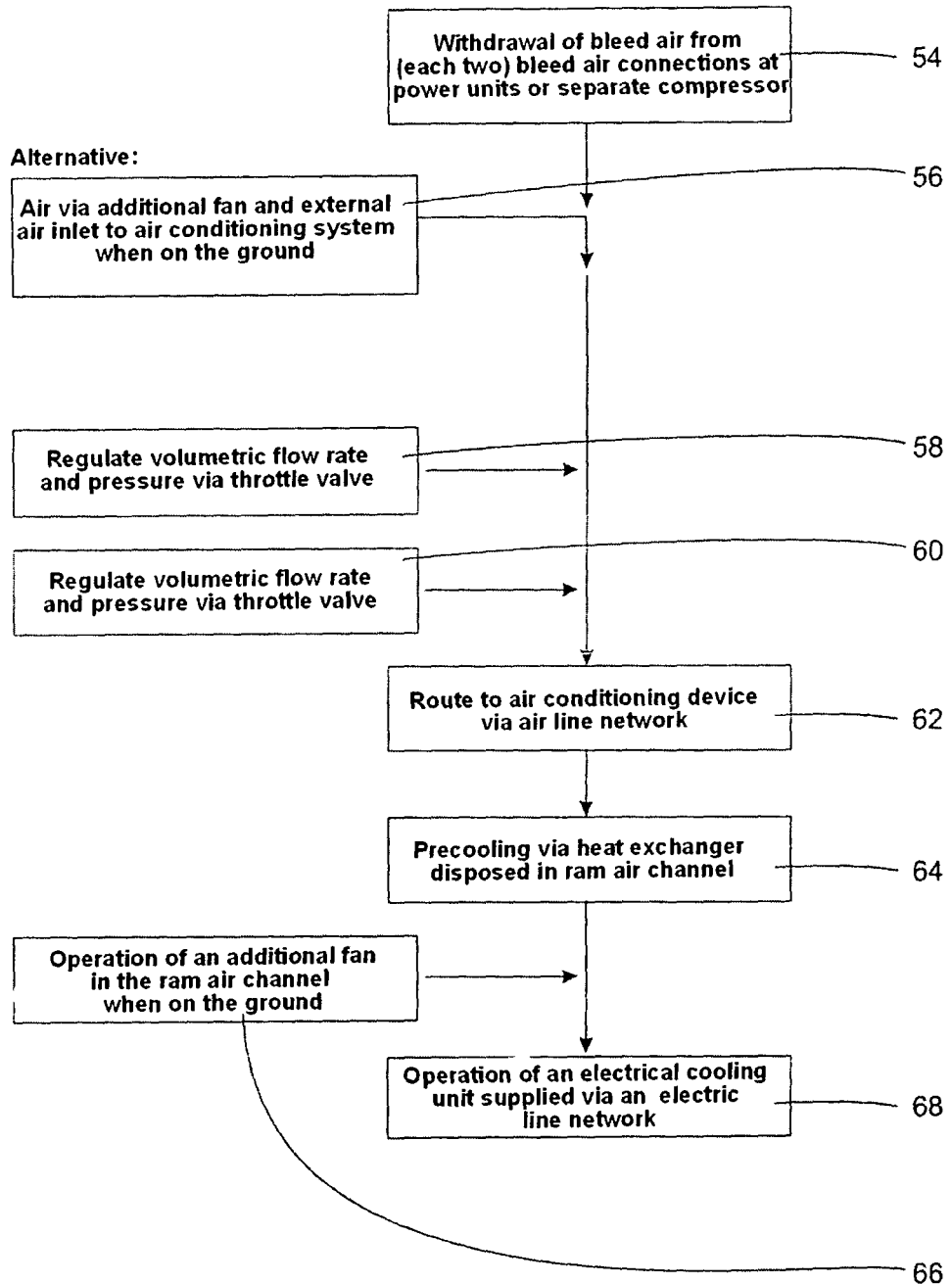

The invention is illustrated in detail in the following on the basis of the figures. The same objects are marked by the same reference characters in the figures, in which:

FIG. 1 is a schematic view of an air conditioning and energy system from the prior art, FIG. 2 is a schematic view of a first embodiment of the system according to the invention, FIG. 3 is a schematic view of a second embodiment of the system according to the invention, FIGS. 4a, b show a comparison of the bleed air pressure variation of a system from the prior art and of the system according to the invention, and FIG. 5 is a schematic representation of the method according to the invention.

The systems which are represented in FIGS. 1-3 are of a symmetrical structure and consist, by way of example, of two mirror-inverted system halves. The use of singular and plural in relation to system components is to be interpreted together with a consideration of the figures, as it appears most appropriate to describe an individual system half with individual system components.

FIG. 1 represents an air conditioning and energy supply system from the prior art. Here bleed air is withdrawn from power units 2 and cooled down to a temperature which is acceptable for downstream appliances by means of precoolers 4. The medium absorbing heat in the precoolers 4 is cooling air in the form of bleed air which is withdrawn from a fan stage of the power units 2 and is at a relatively low temperature. This cooling air absorbs heat of the hotter bleed air from the bleed air connections which are nearer to the combustion chambers of the power units and leaves the precoolers 4 into the environment of the aircraft. The energy absorbed by the cooling air and coming from the power units 2 therefore leaves the area of the air conditioning system without returning.

In this way precooled bleed air passes into the air conditioning units ("packs") 6, in which it is accordingly conditioned by thermodynamic processes—in the case of larger commercial aircraft, for example, by means of an expansion cooling system—and routed to a mixing chamber. The conditioned air is mixed in the mixing chamber with used air from the cabin in a certain mixing ratio and supplied to the cabin. The bleed air is in this respect the sole energy source for operating the packs 6 and for pressurising the cabin.

The bleed air flowing out of the precoolers 4 also passes into the wing anti-icing systems 8, in which it strikes the wing leading edge and prevents the formation of ice here through the input of heat.

It is also usual in the prior art to operate the air conditioning system of the aircraft when on the ground with air from a compressor 12 driven by an APU 10 (also called "load compressor" in the following in the sense of the English term). The air provided by the load compressor 12 is in addition used to start the power units 2 by means of a pneumatic power unit starter unit 14.

Electrical energy is provided by the generators 16 of the power units 2 or of the APU 10, although this is not used by the most important sub-systems of the air conditioning system of the aircraft.

The first embodiment represented in FIG. 2 of the system according to the invention follows a different approach to the use of pneumatic and electrical energy and results in a lower fuel consumption.

Bleed air is extracted from the power units 2 at a pressure level which—compared with conventional systems—is relatively low. Dependent upon the actual flight condition of the aircraft, the bleed air can be extracted from two different bleed air connections 18 and 20, which provide different bleed air pressures. On account of the low pressure level, the resultant bleed air temperature is in a range in which a precooler 4 is no longer required. The bleed air line network has a non-return valve 22 at the connecting point with the bleed air connection 18 of a low pressure in order to prevent a return flow of the bleed air into the power unit 2, while the bleed air is extracted from the bleed air connection 20 of a higher pressure. The bleed air line network also has a throttle valve 24 in the flow path of the bleed air connection 20 of a higher pressure in order to regulate the pressure and volumetric flow rate of the bleed air, so that at least the necessary cabin pressure can be maintained through the action of the bleed air.

If the power units 2 are not in operation on the ground, air is provided by means of a load compressor 12 driven by the APU 10. In contrast to common systems, the required pressure of the air which is to be provided by the APU is relatively low, as the air conditioning system 26 (alternatively to this general term also called "Air Conditioning and Thermal Management System" or "ACTMS") is also operated by electrical energy to a certain degree. The cold production inside the ACTMS can in this respect be based both on an air-assisted and on a vapour-assisted refrigeration process. The electrical energy is provided by an electrical generator/starter unit 28 which is driven by the APU 10. The APU 10 could be in the form either of a conventional gas turbine or, in future, also of a fuel cell. Should a fuel cell be selected for this purpose, the load compressor 12 is driven by an electric motor, which is not represented and derives its electrical energy from the fuel cell.

During flight extracted air is routed away from the bleed air connections 18 and 20 to a heat exchanger 30, in which it is cooled by means of through-flowing ram air. For this purpose the ram air is provided via integrated ram air channels 32 through ram pressure during flight—or through ram air fans 34 integrated into the air conditioning system 26 when on the ground.

The air conditioning system 26 serves to completely provide the temperature regulation for the cabin 36 and the cockpit, which is not represented, as well as additional cooling for the flight computer and power electronics. The cooling through the air conditioning system 26 can be implemented either with common thermodynamic air cycles, evaporator cooling circuits or other thermodynamic cycles which appear suitable for obtaining the necessary cabin air temperature. In addition to the bleed air, the air conditioning system 26 is supplied with electrical energy from the generator/starter units 28, which are driven by the power units 2 or the APU 10. The additional electrical energy is determined by a regulating unit, which is not represented, in order to better adapt the energy extracted from the power units 2 to the energy requirement of the air conditioning system 26.

The generator/starter units 28 are—as can be assumed from the name—designed so that they can be used not just as generators, but also as starter units for starting the power units 2 or the APU 10. In order to start the power units 2 (or a first power unit 2), electrical energy is provided from the generator/starter unit 28 of the APU 10 or alternatively by external power generators ("ground power units").

Also used in the system according to the invention are wing anti-icing systems 38 which are based on electrical energy and are supplied by the generator/starter units 28 of the power units 2 and the APU 10. In this respect the anti-icing systems 38 can be in the form both of thermal systems using electrical heating mats or similar for heating the outer surface of wing leading edge flaps and of electromechanical systems which can mechanically free wing leading edge flaps from ice.

A second embodiment of the system according to the invention is shown in FIG. 3. The fundamental difference of the second embodiment in relation to the first lies in the different operating mode when on the ground. In the second embodiment the cabin air is not provided by a load compressor 12 driven by the APU 10, but by an additional fan which is not represented in detail and is integrated into the air conditioning system 26. During ground handling a valve 40 is opened and outside air is withdrawn from an outside air inlet 42 which is integrated into the ram air channel 32. As soon as the power units 2 are put into operation and are capable of supplying bleed air, the valve 40 is closed and the air conditioning and energy supply system is operated in the same way as described in the case of the first embodiment on the basis of FIG. 2. The second embodiment enables the bleed air line network to be minimised and makes a fully electric APU possible. This results in advantages in terms of weight, space and maintenance costs.

Finally, the bleed air pressure variations of a common air conditioning and energy system (FIG. 4*a*) and of the system according to the invention (FIG. 4*b*) over the flight time are compared by way of example. In FIG. 4*a* a dot-dash curve 44 indicates the bleed air pressure which is necessary to operate an air conditioning system on a day with an average temperature. A dashed line 46 represents the necessary bleed air pressure requirement for a relatively hot day. As the bleed air pressure which is provided has to satisfy all conceivable design situations, the bleed air pressure which is applied to the bleed air connections always lies above the necessary bleed air pressures, so that the curve 48 representing the applied bleed air pressure lies above the curves 46 and 44.

In the system according to the invention the applied bleed air pressure represented by the curve 50 is only higher than the necessary bleed air pressure at an average temperature (curve 52) or in relatively hot weather (curve 54) in certain areas. The pressure and the volumetric flow rate of the withdrawn bleed air only have to be throttled during flight sections in which a relatively high thrust is required. During cruising, however, the bleed air pressure is only sufficient for pressurising the aircraft cabin, but not for cooling. The resulting energy difference, which is represented by the area between the curves 50 and 52 or 54, is exactly compensated by electrical energy from the generator/starter units 28 which is made available to the air conditioning system 26 for the purpose of cooling the bleed air.

Finally, FIG. 5 represents in schematic form the method according to the invention for operating an aircraft air conditioning system. The method according to the invention begins with the provision of air in the form of bleed air which is withdrawn 54 from the power units of the aircraft, for instance via two bleed air connections 18 and 20 or from a separate load compressor 12 driven, for example, by an APU 10. As an alternative to this, air is provided 56 via an additional air inlet 42 and an additional fan when the aircraft is on the ground. The pressure and the volumetric flow rate of the bleed air from the bleed air connections 18 and 20 are in this respect regulated 58 by means of throttle valves 24. In order that a return flow of bleed air, for example from a bleed air connection of a higher pressure via a bleed air connection of a lower pressure, does not take place, the return flow is prevented 60 by means of a non-return valve 22. The air which is provided is then routed 62 to the air conditioning system and precooled 64 via a heat exchanger 30 disposed in the ram air channel 32. When the aircraft is on the ground an additional fan 34 in the ram air channel 32 is operated 66 in order to enable precooling to take place via the heat exchanger 30. The air which is routed to the air conditioning system is finally cooled 68 via an electrical cooling unit which is supplied with electrical energy by the electric line network.

The invention claimed is:

1. Energy supply system for operating at least one air conditioning system of an aircraft, comprising
   at least one air line network and at least one electric line network, wherein
   the air line network is connected to the air conditioning system and to at least one bleed air connection for routing bleed air to the air conditioning system,
   the air conditioning system includes an electrically operable cooling device,
   the electric line network is connected to the air conditioning system and at least one electrical energy source, which is a generator/starter unit, for routing electrical energy to the air conditioning system, and wherein
   the generator/starter unit is adapted to compensate an energy difference between energy required for cooling and energy provided by the bleed air by electrical energy provided by the generator/starter unit.

2. Energy supply system according to claim 1,
in which no precooler operated by bleed air is provided.

3. Energy supply system according to claim 1,
with at least one ram air channel through which ram air flows during flight and which has a heat exchanger which can be connected to the air line network.

4. Energy supply system according to claim 3,
wherein an additional fan to make air flow through the ram air channel when on the ground is integrated into the ram air channel.

5. Energy supply system according to claim 1,
in which the engines of the aircraft each have two bleed air connections at different pressure levels which are connected to the air line network.

6. Energy supply system according to claim 5,
in which the respective bleed air connection of a higher pressure has a throttle valve for regulating the pressure and/or volumetric flow rate of the bleed air withdrawn from the bleed air connection.

7. Energy supply system according to claim 5,
in which the respective bleed air connection of a lower pressure has a non-return valve for preventing the return flow of bleed air from the bleed air connection of a higher pressure via the bleed air connection of a lower pressure into the engine.

8. Energy supply system according to claim 1,
in which the bleed air is withdrawn from a compressor driven by an APU.

9. Energy supply system according to claim 1, with an external air inlet and an additional fan for supplying the air conditioning system with air when on the ground.

10. Energy supply system according to claim 9,
wherein the external air inlet is integrated into the ram air channel.

11. Energy supply system according to claim 8,
in which the engines and the APU of the aircraft are each equipped with a generator/starter unit as an electrical energy source, wherein the generator/starter units are further adapted to start the engines electrically without bleed air.

12. Energy supply system according to claim 1,
in which the cooling device is further adapted to be operated by bleed air by means of an expansion cooling circuit.

13. Energy supply system according to claim 1, and further adapted to supply a de-icing system with electrical energy, wherein the de-icing system is adapted for operation without the use of bleed air.

14. Air conditioning system for an aircraft which is connected to the energy supply system according to claim 1, wherein
the air line network routes bleed air for pressurising the cabin of the aircraft to the air conditioning system, and the electric line network routes electrical energy for operating the electrical cooling device to the air conditioning system.

15. Method for air-conditioning an aircraft using an energy supply system according to claim 1, in which in which the generator/starter unit is controlled to compensate an energy difference between energy required for cooling and energy provided by the bleed air by electrical energy provided by the generator/starter unit,
wherein the bleed air is cooled by an electrically operable cooling device powered via at least one electric line network, and wherein the energy required for cooling of the bleed air is provided by the generator/starter unit in the form of electrical energy.

16. Method according to claim 15,
in which the bleed air is not precooled by a precooler operated by bleed air.

17. Method according to claim 15,
in which the bleed air is precooled by a heat exchanger which is disposed in a ram air channel and can be connected to the air line network.

18. Method according to claim 15,
in which an additional fan is operated to make air flow through the ram air channel when the aircraft is on the ground.

19. Method according to claim 15,
in which the bleed air is withdrawn from two respective bleed air connections at different pressure levels of the engines of the aircraft.

20. Method according to claim 15,
in which the bleed air volumetric flow rate and bleed air pressure from a respective bleed air connection of a higher pressure is regulated by means of a throttle valve.

21. Method according to claim 15,
in which a return flow of bleed air from a bleed air connection of a higher pressure via a bleed air connection of a lower pressure into the engine is prevented by means of a non-return valve.

22. Method according to claim 15,
in which the bleed air is withdrawn from a compressor driven by an APU.

23. Method according to claim 15,
in which air is routed via an additional fan and an external air inlet into the air conditioning system when the aircraft is on the ground.

* * * * *